United States Patent
Wiercinski

(10) Patent No.: US 7,201,820 B2
(45) Date of Patent: Apr. 10, 2007

(54) FLEXIBLE FLASHING FOR MULTIPLANAR BUILDING SURFACES

(75) Inventor: Robert A. Wiercinski, Lincoln, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 11/248,991

(22) Filed: Oct. 11, 2005

(65) Prior Publication Data

US 2006/0081322 A1 Apr. 20, 2006

Related U.S. Application Data

(60) Provisional application No. 60/618,850, filed on Oct. 14, 2004.

(51) Int. Cl.
- B32B 38/04 (2006.01)
- B32B 38/10 (2006.01)
- B32B 37/18 (2006.01)
- B32B 9/06 (2006.01)
- B32B 37/30 (2006.01)

(52) U.S. Cl. ............... 156/247; 156/227; 156/297; 428/40.1; 428/41.8; 225/3

(58) Field of Classification Search ......... 156/225, 156/247; 428/40.1, 343, 352, 354; 162/100–231
See application file for complete search history.

(56) References Cited

U.S. PATENT DOCUMENTS

| | | | |
|---|---|---|---|
| 2,725,322 A | 11/1955 | Muttera ............... 154/53.5 |
| 3,900,102 A * | 8/1975 | Hurst ...................... 206/411 |
| 4,039,706 A * | 8/1977 | Tajima et al. ............ 428/40.3 |
| 4,172,830 A | 10/1979 | Rosenberg et al. ...... 428/245 |
| 4,424,244 A | 1/1984 | Puskadi ..................... 428/40 |
| 4,988,551 A * | 1/1991 | Zegler .................... 428/41.8 |
| 5,061,532 A | 10/1991 | Yamada ................... 428/35.7 |
| 5,705,002 A * | 1/1998 | Sherry ....................... 156/71 |
| 5,916,654 A | 6/1999 | Phillips et al. ........... 428/42.2 |
| 6,235,365 B1 | 5/2001 | Schaughency et al. ... 428/40.1 |
| 6,503,618 B1 | 1/2003 | Jakobi et al. ............ 428/343 |
| 6,723,403 B2 | 4/2004 | Ishii et al. .............. 428/35.7 |
| 6,982,107 B1 * | 1/2006 | Hennen .................. 428/40.1 |
| 2003/0124292 A1 | 7/2003 | Unterreiter ............. 428/40.1 |

FOREIGN PATENT DOCUMENTS

JP 05-239416 7/1993
WO WO2004/070108 8/2004

* cited by examiner

*Primary Examiner*—Chris Fiorilla
*Assistant Examiner*—Sonya Mazumdar
(74) *Attorney, Agent, or Firm*—Stephan P. Williams; Craig K. Leon

(57) ABSTRACT

The invention pertains to a novel method for flashing a door, window, ductwork or other rough opening in a building surface. The method involves the use of a tape strip having a continuous, non-perforated, machine-direction-splittable plastic release sheet liner which is selectively removed in controlled portions without the need for cutting strings. Anisotropic tear-resistance properties of the release liner facilitate a careful, controlled, and progressive installation of the tape strip while avoiding unwanted transverse tearing that could block or foul the adhesive.

11 Claims, 1 Drawing Sheet

FLEXIBLE FLASHING FOR MULTIPLANAR BUILDING SURFACES

CROSS-REFERENCE TO RELATED APPLICATIONS

This application claims the benefit of U.S. Provisional Application No. 60/618,850 filed on Oct. 14, 2004.

FIELD OF THE INVENTION

The invention relates to waterproofing sealants which are in the form of a pre-formed sheet-like structure, and more particularly to a method for flashing detail areas, such as door and window openings, using tape strips having a continuous, non-perforated, machine-direction-splittable plastic release liner having anisotropic tear-resistance properties which facilitate tearing while minimizing fouling or blocking of the adhesive.

BACKGROUND OF THE INVENTION

It is known that substructural surfaces can be sealed in a waterproof manner by application of pre-formed, flexible membranes of waterproofing pressure-sensitive adhesives. The membranes are protected by a release sheet liner made of waxed paper or plastic that can be peeled from the adhesive at the time of application.

The use of split or perforated release sheets is known in the waterproofing industry. In U.S. Pat. No. 4,172,830, for example, waterproofing membranes were disclosed having, release sheets that were perforated, so that strips could be progressively removed from the adhesive layer, and exposed portions of the adhesive could be overlaid onto the back of adjacent, installed membranes.

Another waterproofing membrane having a pre-split or perforated release liner was disclosed in U.S. Pat. No. 5,916,654 of Phillips et al. It was explained that one of the problems with typical one-piece release sheets is that an applicator may have difficulty removing a large liner without tearing the release liner. Tearing of the release liner made it difficult to remove the remaining liner material, and portions of the release liner that remained on the adhesive layer reduced the area of adhesion.

Phillips et al. therefore disclosed the use of a strip of material placed on the adhesive surface below and between each abutting edge of pre-split release liners to allow sections of the release liners to be removed without the (unwaxed) edges of the liners from sticking. If the release liner was perforated instead of pre-split, the strip material was to be located underneath the perforations. Thus, the strip was useful for preventing edge adhesion of release liners, which otherwise would be difficult to remove, and preventing tearing of the liner material which would leave liner material remaining on the adhesive surface. The strip disclosed by Phillips et al. could also served to prevent adhesive from flowing through perforations in the liner material.

In U.S. Pat. No. 6,235,365, Schaughency et al. explained that split release sheets were useful for installing membranes in detail areas such as roof valleys. Split release sheets were also considered useful for when the membrane is applied as a flashing material around windows and doors because a portion of the membrane could be affixed into position, while the remaining portion of the membrane could be covered by the release sheet, and thus not stick to itself or prematurely adhere to the installation surfaces. It was further remarked that split release liner sheets could hinder application in some detail areas, because the applicator would have to deal with two portions of the release sheet liner if she wished to expose at once the entire face of the adhesive layer for attaching the waterproofing membrane. Pre-split release sheets required that the applicator remove both split portions at once during application on flat (non-detail) areas, rendering control and accurate placement difficult.

Schaughency et al. therefore disclosed cutting string located between the adhesive and release liner, for cutting the release sheet liner into smaller portions for selective removal of release liner portions from the waterproofing membrane. Cutting strings were also disclosed in World Patent Application WO2004/070108 by Hamdar et al. for selective removal of release liner.

The objective of the present invention relates to the flashing of the building surfaces, particularly complex or small detail areas, such as door openings, window openings, ductwork passages, and other building surfaces and openings. Methods of the invention involve the use of a flexible membrane flashing tape strip having a release sheet liner that is neither pre-split or perforated and that does not rely upon the use of cutting strings for selective removal of portions thereof. For example, the method can be used for large and flat installations, such as for roofing underlayment applications, as well as very small detail areas, such as around openings or across multi-level surfaces. In particular, methods of the invention are well-suited for installation on multi-planar surfaces, such as building surfaces which form corners and edges.

SUMMARY OF THE INVENTION

In avoiding pre-split release sheets and cutting strings of the prior art, the present invention provides a convenient method for protecting surfaces, particularl very detail areas, such as door, window, ductwork, and other openings.

An exemplary method comprises providing a tape strip having a preformed pressure-sensitive adhesive layer (e.g., 5–100 mils thickness), a backing layer attached to one side of the adhesive layer, and, attached to the opposite side of the adhesive, a continuous, non-perforated plastic release sheet having a cross-direction (CD) tear resistance and machine direction (MD) tear resistance, whereby the ratio of tear resistances CD:MD is at least 2:1 and the MD tear resistance is no greater than 1 pound (the tear resistance values being determined in accordance with ASTM D1938). The method involves removing portions of the release sheet by peeling portions thereof along the machine direction, during progressive attachment of the tape strip to surfaces of the building structure opening. A first portion of the plastic release sheet is removed along the machine direction, without using a cutting string thereby exposing a first portion of the adhesive layer; and the first exposed adhesive layer portion is attached to the target substrate, thereby affixing a first portion of the tape strip into installation position; then a second portion of the plastic release sheet is removed from the adhesive layer to expose a second portion of the adhesive layer; and the exposed second adhesive layer portion is then attached to the substrate.

The plastic release sheet is notched (e.g., using box cutter, or knife point) at the point that defines the desired width of the first portion of the release sheet liner to be removed, and the first portion is then torn in the machine direction, without further use of cutting tools, to expose a longitudinally extending portion of the adhesive layer. The machine-direction-tearable release sheet liner allows an applicator the freedom of selecting the desired width to be removed initially, in contrast to pre-split or perforated release sheets which having a fixed first-removable width portion.

Anisotropic tear-resistance properties of the release liner facilitates a controlled, progressive installation of the tape strip in highly detailed areas, and yet minimizes transverse tearing (cross-direction) which could induce blocking of the adhesive (due to release sheet pieces remaining on the adhesive) or fouling of the adhesive (due to premature exposure of adhesive portions). Further advantages and features of the invention are described in detail hereinafter.

DETAILED DESCRIPTION OF EXEMPLARY EMBODIMENTS

Exemplary tape strips of the present invention are particularly suitable for providing a waterproofing seal within and around openings in building structures such as window, openings, doorway openings, ductwork passages, and other types of openings that can be found in houses and other building structures. The tape strips operate in the manner of conventional waterproofing membranes in that they are flexible, sheet-like articles that provide water- and moisture-sealing properties to porous substrates such as concrete, wood, gypsum board, and other building materials. The tape strips can be applied within and around the rough openings of doors and windows, for example, before the door frame or window frames are installed.

Figure 1:
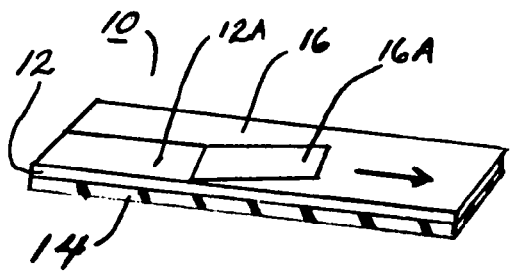
FIG. 1 is a perspective illustration of an exemplary method of the invention wherein a first portion of a plastic release sheet liner is removed in the machine direction (shown by the arrow)

As shown in FIG. 1, an exemplary tape strip 10 of the invention comprises a preformed, pressure-sensitive adhesive layer 12, a backing layer 14 attached on a first major face of the adhesive layer, and a plastic release sheet liner 16 that has anisotropic tear-resistant properties in that they are more easily torn, simply by notching at one of the ends of the release sheet liner 16 and peeling away (in the machine direction designated by the arrow) a substantially rectangular first portion of the release sheet liner 16, to expose a first portion of the adhesive layer 12A. The applicator should pull the release liner portion substantially in a direction that is parallel to the machine direction of the tape strip to ensure that the tearing will align in the desired direction. While the initial notching is preferably done by hand using a box cutter or other blade device, the tearing of the plastic release sheet is preferably done by hand (e.g., pulling on the plastic sheet liner at 16A) by hand without using a string, blade, or other cutting tool.

It is contemplated that adhesive layers 12 can comprise materials as conventionally used in the waterproofing art, such as rubber-modified asphaltic adhesive or butyl adhesive. The average thickness of the adhesive layer 12 may be 5–100 mils, or more preferably 10–60 mils. The backing layer may comprise a continuous polymer film sheet (e.g., polyolefin such as polyethylene, polypropylene), a woven or nonwoven fabric, or layer of granular material (e.g., sand, carbonate, talc, etc.), and it may have an average thickness of 1–25 mils or more.

An exemplary release sheet 16 of the inventions is non-perforated and continuous in nature. It is removably attached to the adhesive layer 12 and is peeled from the tape strip 10 when pulled along the length of the tape strip (machine direction). The plastic release sheets 16 have a cross-direction (CD) tear resistance and machine direction (MD) tear resistance, whereby the ratio of tear resistances CD:MD is at least 2:1 and the MD tear resistance is no greater than 1 pound, the tear resistance values being determined in accordance with ASTM D1938. More preferably the CD:MD ratio is at least 3:1; and, more preferably, the CD:MD ratio is at least 4:1 or more. More preferably, the MD tear resistance resistance is no greater than 0.75 pound (ASTM D1938).

Thus, it can be said that the plastic release sheets 16 have an anisotropic tear resistance characteristic in that it is easier to tear them in the machine direction, or in a straight direction along the length of the tape strip, such that substantially rectangular portions of the release sheet can be removed.

Figure 2:
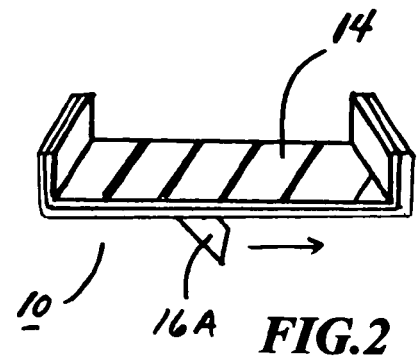
FIG. 2 is another perspective illustration of the tape strip of FIG. 2 shown in an inverted position ready for installation onto a building surface opening.

As shown in FIG. 1, a first portion 16A of the release sheet liner 16 is removed to expose a first portion 12A of the adhesive layer 12; and then the tape strip 10 is inverted, as shown in FIG. 2, such that the first exposed adhesive layer portion can be adhered onto the substrate and anchor the tape strip 10 into place.

Figure 3:
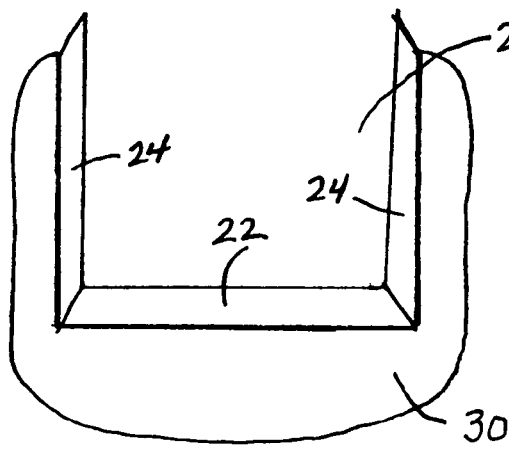
FIG. 3 is a perspective partial illustration of a door opening or window opening (shown on the left side of the drawing) wherein the tape strip of FIG. 2 is progressively installed (shown on the right side of the drawing) during removal of the remainder of the first portion of the release liner.
Figure 3:
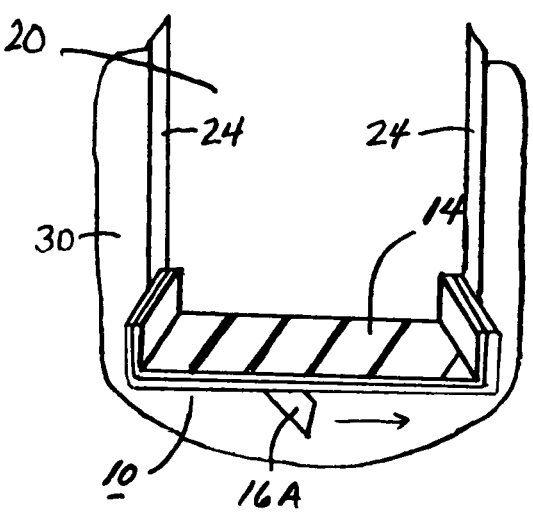

As shown in FIG. 3 (left side), the preferred substrate will be an opening 20 in a building wall 30 or foundation, such as a rough door opening, window opening, ductwork opening, etc., which will usually have a number of non-coplanar surfaces, usually in vertical 24 and horizontal 22 directions. The tape strip 10 of FIG. 2 is then anchored into the opening by attaching the first exposed adhesive portion (12A of FIG. 1) onto one of the surfaces (in this case left-most vertical surface 24), once the tape strip is suitably positioned within the opening 20, with backing layer 14 facing outwards. The remainder of the first portion 16A of the release sheet liner 16 can then be removed, by pulling along the machine direction shown by the arrow in FIG. 3, so that a longitudinally extending portion of the waterproofing membrane strip 10 can be progressively exposed and affixed carefully by the applicator into installation position. By employing a release sheet liner 16 having an anisotropic tear-resistance characteristic, the applicator can be sure that a constant width of adhesive layer 12A is being exposed to anchor the tape-strip 10 into the target position. As shown in FIG. 3, at least two intersecting surfaces surfaces 20 and 24, and the corners defined between these surfaces, can conveniently be protected by the tape strip 10.

Figure 4:
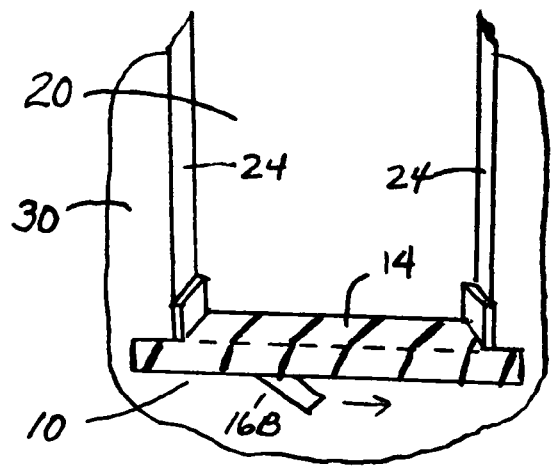
FIG. 4 is a perspective partial illustration of the tape strip of FIG. 3 wherein a second portion of the tape strip is attached during removal of a second portion of the release liner.

As shown in FIG. 4 the remaining unattached portion of the tape strip 10 can be fitted into place, against the substrate 30 (e.g., roof, wall, or foundation surrounding the opening 20). This is done by cutting the backing layer 14 and adhesive layer (12) to size, and then carefully removing a second portion 16B of the plastic release sheet liner 16 in the machine direction shown by the arrow. Accordingly, a second portion of the tape strip 10 is affixed into installation position.

The procedure shown in FIGS. 1 through 4 can then be repeated for covering each of the sides 24/30 of the opening, as well as for the top of the opening (not shown).

The partial release liner method discussed hereinabove may be used to apply the tape strip in other situations. For example, the tape strip may be used to attach a tape to a substantially flat surface, such as would occur in sealing a window frame to exterior building surface.

For example, the tape strip can be applied as a flashing to a rough window or door opening (e.g., sill), and a window or door frame can be installed over this flashing in a similarly progressive manner wherein a first longitudinal portion of the adhesive is exposed so that the tape strip can be initially edge-attached to the substrate as a first portion of the release sheet is being peeled off. Then, once the long tape strip is anchored into position, a second portion of the release sheet is peeled off to attach a further portion of the adhesive to the substrate.

Given the anisotropic tear-resistant characteristic of the plastic release sheet liner 16, it will then be evident from the drawing and explanations provided herein that method of the invention can also involve more than two stages of selective removal of the release liner 16, so as to facilitate progressive installation of the tape strip 16 to openings. For example, the various multi-planar surfaces of the openings 22/24/30 may be stepped, so that the process of selective removal of portions of the plastic release sheet 16 can be repeated a number of times.

The foregoing exemplary embodiments are provided for illustrative purposes only and are not intended to limit the scope of the invention.

It is claimed:

1. A method for protecting multiplanar structural substrate surfaces comprising at least a first substrate surface and a second substrate surface, wherein the first substrate surface comprises at least two surfaces defining at least one corner, and the second substrate surface is perpendicular to the first substrate surface, the method comprising:

providing a tape strip comprising a pre-formed pressure-sensitive adhesive layer having first and second major faces, said adhesive layer having an average thickness no less than 5 mils and no greater than 100 mils; a backing layer attached to said adhesive layer first major face; and a non-perforated continuous plastic release sheet removably attached to said adhesive layer second major face;

said plastic release sheet having a cross-direction (CD) tear resistance and machine direction (MD) tear resistance, whereby the ratio of tear resistances CD:MD is at least 2:1 and said MD tear resistance is no greater than 1 pound (all tear resistance values being determined in accordance with ASTM D1938);

removing a first portion of said plastic release sheet by tearing said plastic release sheet in the machine direction, without using cutting string, thereby exposing a first portion of said adhesive layer;

attaching said first exposed adhesive layer portion onto the first substrate surface, thereby affixing a portion of the tape strip into installation position;

partially slitting a non-affixed portion of said tape strip along its length;

removing the entire remaining portion of said plastic release sheet from said tape strip to expose a second portion of said adhesive layer; and attaching said exposed second adhesive layer portion to the second substrate surface, thereby affixing a second portion of the tape strip into installation position.

2. The method of claim 1 wherein said CD:MD tear resistance ratio is at least 3.

3. The method of claim 1 wherein said CD:MD tear resistance ratio is at least 4.

4. The method of claim 1 wherein said MD tear resistance is less than 0.75 pounds.

5. The method of claim 1 wherein said release sheet is notched and torn from the notch in a direction parallel to said tape strip, whereby a first portion of said release sheet is removed from said tape strip.

6. The method of claim 1 wherein more than two sections of the release sheet are removed in a stepwise fashion.

7. The method of claim 1 wherein said tape strip is a waterproofing membrane, and wherein the multiplanar structural substrate surfaces comprise the surfaces of a door or window opening.

8. The method of claim 1 wherein said plastic release sheet comprises polyethylene, polypropylene, or mixture thereof.

9. The method of claim 1 wherein said adhesive is a rubberized asphalt or butyl adhesive.

10. The method of claim 1 wherein said backing layer is a continuous polyolefin film, a woven or nonwoven layer, or a layer of granular material.

11. The method of claim 10 wherein said backing layer is a polyethylene film.

* * * * *